US007857878B2

(12) United States Patent
Park et al.

(10) Patent No.: US 7,857,878 B2
(45) Date of Patent: Dec. 28, 2010

(54) DUST COLLECTION UNIT FOR VACUUM CLEANER

(75) Inventors: Tae Jin Park, Gimhae-si (KR); Seong Yong Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1045 days.

(21) Appl. No.: 11/258,997

(22) Filed: Oct. 27, 2005

(65) Prior Publication Data

US 2006/0090428 A1 May 4, 2006

(30) Foreign Application Priority Data

Oct. 29, 2004 (KR) ..................... 10-2004-0087104

(51) Int. Cl.
*B01D 50/00* (2006.01)

(52) U.S. Cl. ............................ 55/337; 55/357; 55/345; 55/346; 55/428; 55/429; 15/352; 15/353

(58) Field of Classification Search .................. 55/337, 55/357, 345–346, 428–429, 349, DIG. 3; 15/352–353

See application file for complete search history.

(56) References Cited

U.S. PATENT DOCUMENTS

| | | | | |
|---|---|---|---|---|
| 2,010,128 | A | 8/1935 | Arnold | |
| 2,143,144 | A | 1/1939 | Fagerberg | |
| 2,553,175 | A * | 5/1951 | Davenport et al. | 55/343 |
| 3,425,192 | A * | 2/1969 | Davis | 55/345 |
| D484,286 | S | 12/2003 | Dyson et al. | |
| 6,679,930 | B1 | 1/2004 | An et al. | |
| 6,835,222 | B2 | 12/2004 | Gammack | |
| 7,128,770 | B2 | 10/2006 | Oh et al. | |
| 7,309,368 | B2 | 12/2007 | Oh et al. | |
| 7,335,242 | B2 * | 2/2008 | Oh | 55/343 |
| 7,361,200 | B2 | 4/2008 | Oh et al. | |
| 7,491,255 | B2 | 2/2009 | Jung | |
| 7,556,661 | B2 | 7/2009 | Jeong et al. | |
| 2004/0144070 | A1 | 7/2004 | Gammack et al. | |
| 2004/0194250 | A1 | 10/2004 | Conrad et al. | |
| 2005/0050678 | A1 | 3/2005 | Oh et al. | |
| 2005/0251951 | A1 | 11/2005 | Oh et al. | |
| 2006/0107629 | A1 | 5/2006 | Oh | |
| 2006/0123590 | A1 | 6/2006 | Fester et al. | |

FOREIGN PATENT DOCUMENTS

| | | |
|---|---|---|
| DE | 201 09 699 U1 | 11/2001 |

(Continued)

*Primary Examiner*—Duane Smith
*Assistant Examiner*—Ives Wu
(74) *Attorney, Agent, or Firm*—Ked & Associates, LLP

(57) ABSTRACT

A dust collection unit for a vacuum cleaner includes a first dust collection part for filtering foreign objects in air, a second dust collection part for filtering foreign objects in the air that has passed through the first dust collection part, and a dust collection container having first and second dust collection chambers that correspond to the first and second dust collection parts, respectively. The first and second dust collection chambers store the foreign objects filtered by the respectively first and second dust collection parts in a state where parts of the respective first and second dust collection parts are received in the respective first and second dust collection chambers and the first and second dust collection chambers are provided in a line.

20 Claims, 5 Drawing Sheets

FOREIGN PATENT DOCUMENTS

| | | | | |
|---|---|---|---|---|
| DE | 10 2004 028 677 | A1 | | 3/2005 |
| DE | 10 2004 028 675 | A1 | | 4/2005 |
| DE | 10 2004 028 676 | A1 | | 4/2005 |
| DE | 10 2004 028 678 | A1 | | 4/2005 |
| DE | 10 2004 034 015 | A1 | | 9/2005 |
| FR | 2 619 498 | A1 | | 2/1989 |
| FR | 2 865 917 | A1 | | 8/2005 |
| GB | 2 360 719 | A | | 10/2001 |
| GB | 2 372 434 | A | | 8/2002 |
| GB | 2 399 780 | A | | 9/2004 |
| GB | 2 406 065 | B | | 10/2005 |
| GB | 2 406 066 | B | | 1/2006 |
| GB | 2 410 912 | B | | 2/2006 |
| GB | 2 406 064 | B | | 11/2006 |
| GB | 2 406 067 | B | | 11/2006 |
| JP | 52-14775 | | | 7/1975 |
| JP | 05-123610 | A | | 5/1993 |
| JP | 05-220424 | A | | 8/1993 |
| KR | 10-2002-0028498 | A | | 4/2002 |
| NL | EP 489468 | A1 | * | 11/1991 |
| NL | EP-0489468 | A1 | * | 11/1991 |
| RU | 2 236 813 | C2 | | 9/2004 |
| RU | 2 237 424 | C2 | | 10/2004 |
| WO | WO 99/49978 | A2 | | 10/1999 |
| WO | WO 00/64321 | A1 | | 11/2000 |
| WO | WO-00/74548 | A1 | * | 12/2000 |
| WO | WO 00/74548 | A1 | * | 12/2000 |
| WO | WO 00/74548 | A1 | | 12/2000 |
| WO | WO 02/067742 | A2 | | 9/2002 |
| WO | WO 02/067756 | A1 | | 9/2002 |
| WO | WO 02/067757 | A1 | | 9/2002 |
| WO | WO 02/069778 | A1 | | 9/2002 |

* cited by examiner

DUST COLLECTION UNIT FOR VACUUM CLEANER

BACKGROUND OF THE INVENTION

1. Field of the Invention

The present invention relates to a vacuum cleaner, and particularly, to a dust collection unit OF a vacuum cleaner, which has a first dust collection part for filtering relatively large foreign objects and a second dust collection part for filtering relatively small foreign objects, the first and second dust collection parts being separated from each other. In addition, the present invention further relates to a dust collection unit for a vacuum cleaner, which is designed in a proper size and shape so that it can be easily mounted in a main body of the vacuum cleaner.

2. Description of the Related Art

A vacuum cleaner is used to clean a room or other spaces by sucking air containing foreign objects and filtering the foreign object using vacuum pressure generated therein. In order to filter the foreign objects contained in the sucked air, a dust collection unit is provided in the vacuum cleaner and a paper filter designed with a predetermined structure is provided in the dust collection unit.

The paper filter is formed of porous material so that the foreign objects are filtered while the air containing the foreign objects passes through the filter.

However, since it is inconvenient to reuse the paper filter and it is difficult to clean the filter, a cyclone type vacuum cleaner has been recently proposed. In the cyclone type vacuum cleaner, outer air containing foreign objects is sucked through a suction nozzle is directed to a collection chamber through a suction guide. Since the suction guide extends in a tangential direction of the collection chamber, the sucked air containing the foreign objects spirally rotates in the collection chamber, in the course of which relatively heavy foreign objects falls downward. Then, the air passes through a filter member, in the course of which relatively small foreign objects contained in the air are filtered by the filter.

However, when the filter member formed of a porous filter is combined with the cyclone unit, the problem of periodically cleaning the filter still remains. When the foreign objects clogs the porous filter, an airflow rate is reduced, thereby deteriorating the operational efficiency of the vacuum cleaner.

To solve the above problems, in recent years, a multi-cyclone type dust collection unit in which the cyclone unit is provided in plurality to generate a plurality of cyclone air flows so that the foreign objects contained in the air can be filtered by only the cyclone air flows, has been developed.

However, in order to generate a variety of cyclone airflows, a relatively large space must be defined in the multi-cyclone type dust collection unit. In this case, an overall size of the dust collection unit increases, thereby undesirably increasing an overall volume of the vacuum. Therefore, it is not easy for the user to handle the vacuum cleaner.

SUMMARY OF THE INVENTION

Accordingly, the present invention is directed to a dust collection unit for a vacuum cleaner that substantially obviates one or more problems due to limitations and disadvantages of the related art.

An object of the present invention is to provide a dust collection unit for a vacuum cleaner, in which an arrangement of a dust collection part is optimized.

Another object of the present invention is to provide a dust collection unit for a vacuum cleaner, which can effectively filter small foreign objects as well as large foreign objects, thereby improving the dust collection efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dust collection unit for a vacuum cleaner, including: a first dust collection part for filtering foreign objects in air; a second dust collection part for filtering foreign objects in the air that has passed through the first dust collection part; and a dust collection container having first and second dust collection chambers that correspond to the first and second dust collection parts, respectively, wherein the first and second dust collection chambers store the foreign objects filtered by the respective first and second dust collection parts in a state where parts of the respective first and second dust collection parts are received in the respective first and second dust collection chambers and the first and second dust collection chambers are provided in a line.

In another aspect of the present invention, there is provided a dust collection unit for a vacuum cleaner, including: a dust collection container provided with first and second dust collection chambers divided from each other and arranged in a line; a bottom cover for opening and closing a lower portion of the dust collection container; an airflow guide plate provided above the dust collection plate to guide the air that has passed through the first dust collection chamber to the second dust collection chamber; a plurality of small cyclones extending downward from the airflow guide plate and opened toward the second dust collection chamber; a discharge guide tube for receiving a part of each small cyclone and guiding the air that has passed through the small cyclones upward; an exhaust guide plate integrally formed with the discharge guide tube to cover the airflow guide plate; and a top cover provided above the exhaust guide plate to guide the air discharged through the discharge guide tube to an external side.

In another aspect of the present invention, there is provided a dust collection unit for a vacuum cleaner, comprising: a dust collection container provided with first and second dust collection chambers divided from each other and arranged in a line; a bottom cover for opening and closing a lower portion of the dust collection container; an airflow guide plate provided above the dust collection plate to guide the airflow; a plurality of small cyclones extending downward from the airflow guide plate to filter minute particles contained in the air; a discharge guide tube for guiding the air that has passed through the small cyclones upward; an exhaust guide plate integrally formed with the discharge guide tube to cover the airflow guide plate; and a top cover provided above the exhaust guide plate to guide the air discharged through the discharge guide tube to an external side.

In still another aspect of the present invention, there is provided a dust collection unit for a vacuum cleaner, including: a dust collection container provided with first and second dust collection chambers divided from each other and arranged in a line; an airflow guide plate provided above the dust collection plate to guide the airflow; a plurality of small cyclones extending downward from the airflow guide plate to filter minute particles contained in the air; a discharge guide tube for guiding the air that has passed through the small cyclones upward; and an exhaust guide plate integrally formed with the discharge guide tube to cover the airflow guide plate, wherein outer edges of the dust collection container, the airflow guide plate and the exhaust guide plate are formed to be similar to each other.

According to the present invention, the dust collection efficiency is improved.

In addition, a variety of cyclone airflows are possibly generated and no filter member is provided, thereby effectively removing small foreign objects as well as large foreign objects and providing the convenience in use to a user.

Furthermore, since the airflow system is effectively designed, the airflow resistance can be reduced to improve the dust collection efficiency.

In addition, the collected foreign objects can be exhausted by opening a lower cover, thereby further improving the user's convenience.

A dust collection unit for a vacuum cleaner, comprises a first chamber (111) having a top and a bottom and a filter (170) provided therein, the filter (170) having a cylindrical shape with an opening in a middle and a plurality of holes (172) formed on a surface of the filter (170), the first chamber (111) further having an air guide (112) provided near the top of the first chamber to guide the air introduced in a tangential direction along an inner surface of a wall of the first chamber such that the air spirally rotates in the first chamber (111) and foreign objects of a first type in the air drops toward the bottom of the first chamber, and the air passes through the holes of the filter to flow through the opening in the middle of the filter; a second chamber (112) having a top and a bottom, a portion of the wall of the first chamber (111) being commonly shared by the second chamber; a bottom cover (130) commonly shared by the first chamber and the second chamber, the bottom cover being pivotally connected to the wall for opening or closing both bottoms of the first and second chambers, wherein a first surface area of the bottom cover is used to cover the bottom of the first chamber and a second surface area of the bottom cover is used to cover the bottom of the second chamber, and the first surface area is larger than the second surface area; a first guide plate (150) having an air intake tube (152) provided on a portion of the first guide plate, which is provided over the top of the first chamber (111), and a plurality of air intake holes (166) provided on another portion of the first guide plate (150), which is provided over the top of the second chamber, each of the plurality of air intake holes (166) having a smaller diameter than the air intake tube (152) and the air intake tube (152) being aligned with the opening in the middle of the filter (170), a plurality of small cyclones (160) aligned under the plurality of the air intake holes (166), a plurality of air intake guide members (168) aligned over the plurality of air intake holes (166), and an airflow guide (154) provided on the first guide plate (150) and a portion of the air flow guide (154) being provided immediately adjacent to a portion of the air intake tube (152), wherein the air flowing through the middle of the filter (170) is guided through the air intake tube (152), the airflow guide (154) directs the air towards the plurality of air intake holes (166) and the plurality of air intake guide members (168) guide the air into the plurality of cyclones (160) such that the air spirally rotates and foreign objects of a second type in the air drop toward the bottom of the second chamber; a second guide plate (140) provided over the first guide plate (150), the second guide plate (140) having a plurality of openings and a first barrier (145) to guide the flow of air, air flowing upwards from the plurality of small cyclones (160) flow through the plurality of openings; and a top cover (120) provided over the second guide plate (140), the top cover (120) having an air exhaust guide (122) on one side of the top cover (120), wherein the air flowing through the openings is directed by the first barrier (145) to the air exhaust guide (122).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
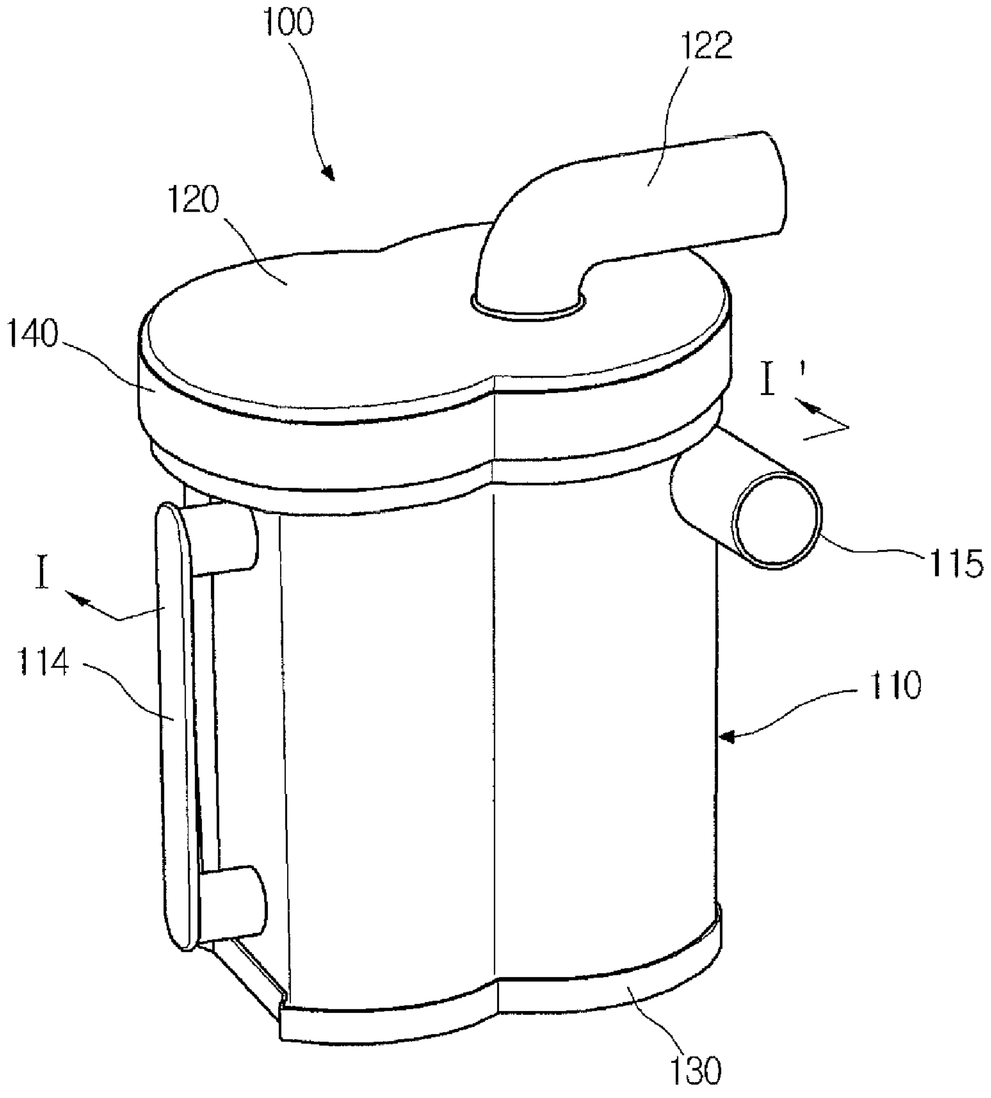
FIG. 1 is a perspective view of a dust collection unit according to an embodiment of the present invention.
Figure 2:
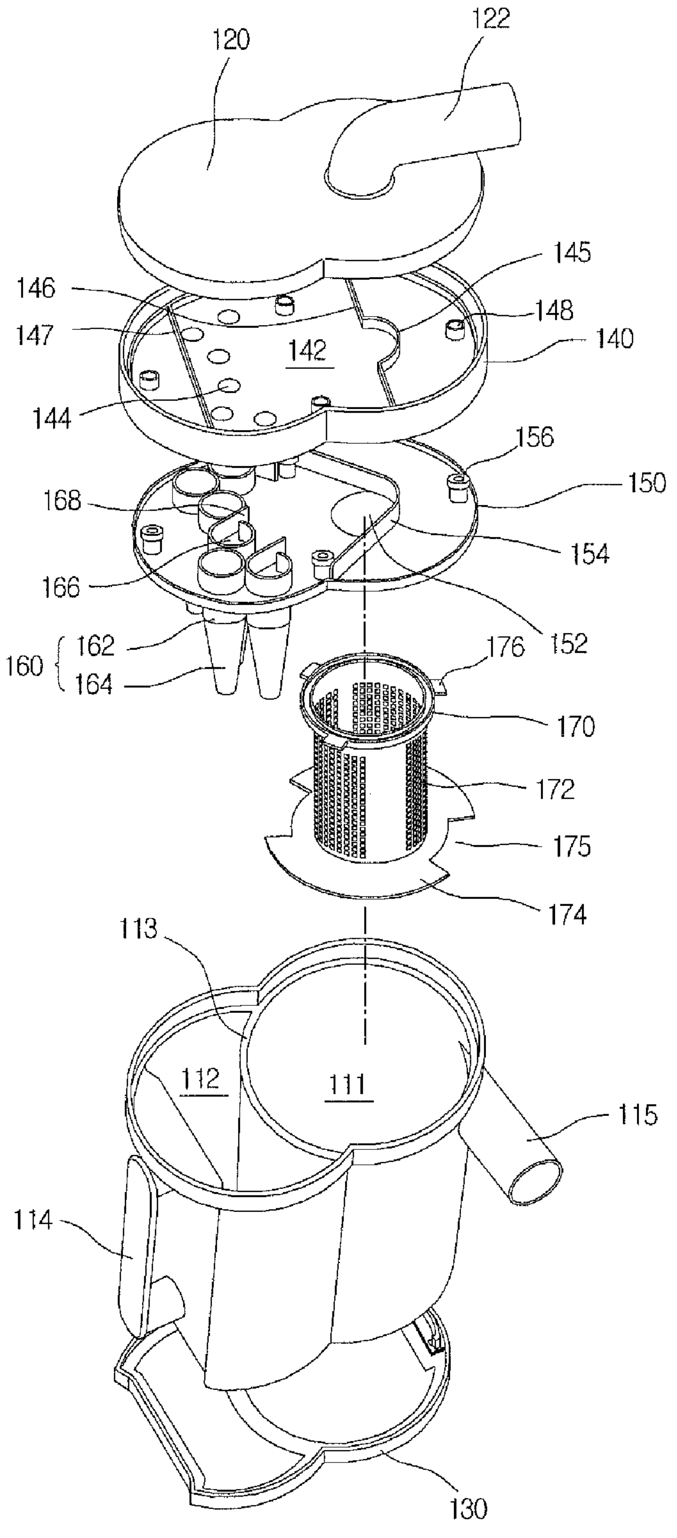
FIG. 2 is an exploded perspective view of a dust collection unit depicted in FIG. 1.

FIGS. 1 and 2 show a dust collection unit according to an embodiment of the present invention.

Referring to FIGS. 1 and 2, the inventive dust collection unit includes a dust collection container 110 having an 8-shaped section.

An inner space of the dust collection container 110 is divided into first and second dust collection chambers 111 and 112 that are arranged in a line and designed to respectively receive first and second dust collection parts that will be described later.

A barrier 113 is formed between the first and second dust collection chamber 111 and 112. The barrier 113 is curved toward the second dust collection chamber 112 such that the first collection chamber 111 can be formed in a cylindrical shape. Therefore, a horizontal section of the first dust collection chamber 111 is formed in a circular shape by which cyclone airflow occurs in the first dust collection chamber 111.

Since the first and second dust collection chambers 111 and 112 are arranged in a line, a length of the dust collection unit is increased while a width is reduced. That is, a section of the dust collection unit is generally formed to be relatively flat. Therefore, when the dust collection unit can be easily inserted even in an upright type vacuum cleaner having a relatively narrow width. For example, when the dust collection unit 100 is inserted in the upright type vacuum cleaner, it becomes possible that the first dust collection chamber 111 is disposed in the vacuum cleaner while the second dust collection chamber 112 is projected out of the vacuum cleaner, making it easy to mount the dust collection unit in the vacuum cleaner. In addition, the first and second dust collection chambers are completely separated from each other, the airflow in one of the chambers does not affect the airflow in the other of the chambers, thereby further improving the dust collection efficiency.

The dust collection parts will be now described more in detail.

A suction guide 115 is formed on an upper portion of the dust collection container 110 defining the first dust collection chamber 111. The suction guide 115 has a first end projected out of the dust collection container 110 to guide the air introduced into the dust collection container 110 in a tangential direction along an inner wall of the dust collection container 110. Therefore, the suction guide is formed to be inclined at an outer surface of the dust collection container 110.

A handle 114 is formed on a side portion of the dust collection container 110. The handle 114 is designed such that the user can easily grasp the same. That is, the handle 114 is formed extending outward from the side portion of the dust collection container 110.

A coupling hinge (see 116 of FIG. 4) is provided on a lower end of the side portion of the dust collection container 110. A bottom cover 130 is pivotally coupled to the coupling hinge 116. The coupling hinge 116 is partly grooved toward an inside of the dust collection container 110 so that there is no confliction when the dust collection container 110 is mounted in a main body of the vacuum cleaner.

A top of the dust collection container 110 is closed by a top cover 120. The top cover 120 is formed corresponding to the upper portion of the dust collection container 110 and detachably installed on the top of the dust collection container 110. The top cover 120 is provided with an air exhaust guide 122 extending upward. The air whose foreign objects are filtered by the first and second dust collection parts is exhausted by the air exhaust guide 122.

A bottom of the dust collection container 110 is closed by a bottom cover 130. The bottom cover 130 is formed corresponding to a lower portion of the dust collection container 110 to simultaneously open and close the first and second dust collection chambers 111 and 112.

The bottom cover 130 is pivotally mounted by the coupling hinge 116 provided on the dust collection container 110. That is, a right end of the bottom cover 130 is hingedly coupled to the coupling hinge 116 and a left end thereof is selectively coupled to a lower end by a coupling member such as a hook projection.

An exhaust guide plate 140 is provided under the top cover 120, having a shape corresponding to the top cover 120 to divide the inner space of the dust collection container 110 into upper and lower chambers. Therefore, an exhaust passage 142 is formed between the top cover 120 and the exhaust guide plate 140. That is, since the exhaust guide plate 140 is spaced downward form the top cover 120, a space is defined between the exhaust guide plate 140 and the top cover 120. This space functions as an exhaust passage through which the air is directed to the exhaust guide 122.

Figure 3:
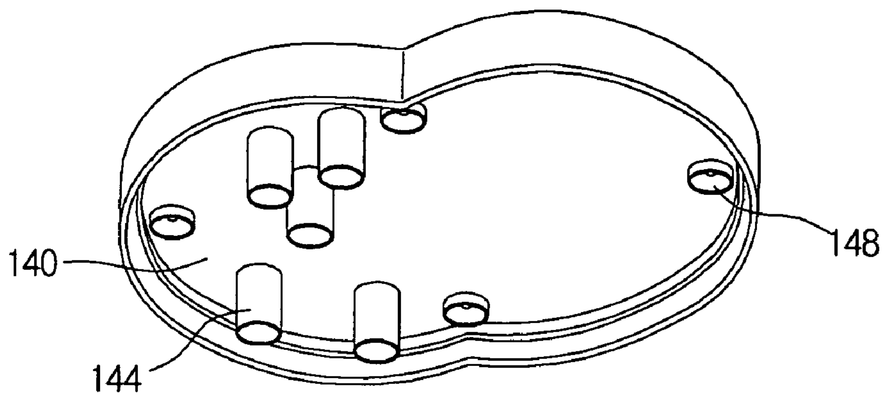
FIG. 3 is a bottom perspective view of an air exhaust guide plate depicted in FIG. 2.

A plurality of discharge guide tubes 144 are formed on the exhaust guide plate 140. As shown in FIG. 3, each of the discharge guide tube 144 is formed in a cylindrical shape and projected downward from the exhaust guide plate 140. The discharge guide tubes 144 are located in a small cyclone 160 that will be described later. Therefore, the discharge guide tubes 144 guides the air to the exhaust passage 142 via the exhaust guide plate 140.

Left and right barriers 147 and 146 are formed on left and right portions of the top of the exhaust guide plate 140. The barriers are provided to guide the airflow. The left barrier 147 is located at a left side of the discharge guide tubes 144 to prevent the air directed upward through the exhaust guide tube 144 from flowing leftward. The right barrier 146 is located at a left side of the discharge guide tubes 144 to prevent the air directed upward through the exhaust guide tube 144 from flowing rightward. The right barrier 146 is provided with a semi-circular groove 145, which corresponds to a lower end of the exhaust guide 122 to guide the air in the exhaust passage 142 to the exhaust guide 122.

Furthermore, the exhaust guide plate 140 is provided with screw holes 148 through which screws penetrate. Preferably, the screw holes 148 are provided on front, rear, left and right portions of the exhaust guide plate 140. Therefore, the exhaust guide plate 140 can be fixed on the top cover 120 by the screws.

Meanwhile, an airflow guide plate 150 is provided under the exhaust guide plate 140. The airflow guide plate 150 is spaced away from the exhaust guide plate 140 and formed in a shape corresponding to that of the exhaust guide plate 140. Therefore, a sealed space is defined between the exhaust guide plate 140 and the airflow guide plate 150. The air flows along the sealed space.

A plurality of small cyclones 160 functioning as the second duct collection part is formed on the airflow guide plate 150. The small cyclones 160 are formed on a left portion of the airflow guide plate 150 to filter the relatively small foreign objects using centrifugal force generated by the spiral flow of the fluid.

That is, each of the small cyclones 160 includes a cylindrical tube 162 and a cone-shaped tube 164 extending from the cylindrical part 162. A diameter of the cone part 164 is gradually reduced it goes downward. Since the small cyclones 160 are collected at a side of the air intake tube 152, the airflow resistance applied to an airflow path is reduced.

An air intake hole 166 through which the air passed through the first collection part is introduced is formed on a side portion of the upper end of the cylindrical tube 162 of the small cyclone 160. The air intake hole 166 is formed corresponding to an upper end side of the cylindrical tube 162 extending upward from the airflow guide plate 150.

An air intake guide member 168 is formed on the air intake hole 166 and projected outward. The air intake guide member 168 is formed at least one of the left and right sides of the air intake hole 166 and oriented toward an air intake tube 152 that will be described later.

The discharge guide tube 144 is located in the corresponding cylindrical tube 162 of the small cyclone 160. Therefore, the air that is flowing downward by the small cyclone 160 is guided by the discharge guide tube 144 and discharged above the exhaust guide plate 140.

The air intake tube 152 is integrally formed with a right portion of the airflow guide plate 150. The air intake tube 152 partly extends downward from the airflow guide plate 150 to guide the air passed through the first collection part above the airflow guide plate 150.

An airflow guide 154 is further formed on the top of the airflow guide plate 150. The airflow guide 154 extends upward to the top of the airflow guide plate 150 to prevent the flow of the dust and foreign objects so that the air guided above the airflow guide plate through the air intake tube 152 can be directed toward the air intake hole 166 of the small cyclone 160 without being dispersed at the top portion of the airflow guide plate 150. Therefore, the airflow guide 154 is formed in a >-shape when it is viewed from a top to enclose the upper-right portion of the air intake tube 152.

The airflow guide plate 150 is further provided with screw-coupling portions 156 corresponding to the screw holes 148 formed on the exhaust guide plate 140. Therefore, a screw passing through the screw hole 148 is coupled to the screw coupling portion 156, thereby fixing the exhaust and airflow guide plates 140 and 150 on the top cover 120.

Sealing members may be provided between the top cover 120, the exhaust guide plate 140 and the airflow guide plate 150. The sealing members may be formed in an elastic material.

A filter member 170 is installed on a right-lower portion of the airflow guide plate 150. The filter member 70 constitutes the first dust collection part that primarily filter the foreign objects contained in the air introduced from the suction guide 115 of the dust collection container 110. The filter member 170 is formed in a cylindrical shape and provided with a plurality of air holes 172. The filter member 170 provided with the air holes 172 may be made through an injection molding process. Each of the air holes 172 is designed having a predetermined diameter that allows only minute particles to pass therethrough. That is, relatively large foreign objects cannot pass through the air holes 172 but falls downward. Preferably, the air holes are not formed at a colliding portion with which the air introduced through the suction guide 115 directly collides. That is, when the air holes are formed at the colliding portion, the air introduced in the tangential direction along the inner wall of the dust collection container 110 through the suction guide 115 may be goes out through the air holes 172 before the air spirally rotates. Therefore, it is preferable that the air holes are not formed on the colliding portion. The filter member 170 is located on a center portion of the first dust collection chamber 111 and detachably mounted on the bottom of the airflow guide plate 150. Accordingly, the air intake tube 152 formed on the airflow guide plate 150 is to be located in an upper end of the filter member 170. The filter member 170 may be omitted when the foreign objects can be completely filtered by the first and second dust collection parts. In this case, there is no need to wash the filter member, improving the user's convenience.

A dividing plate 174 is provided on a lower end of the filter member 170. The dividing plate 174 divides the first dust collection chamber 111 into upper and lower chambers, functioning to prevent the foreign objects dropt into the lower chamber from being scattered into the upper chamber.

Foreign object passing holes 175 are formed on both side ends of the dividing plate 174. The foreign objects in the upper chamber are dropt into the lower chamber through the foreign object passing holes 175. That is, the foreign objects contained in the air introduced through the suction guide 115 are filtered by the filter member 170 and descends along the inner wall of the dust collection container 110. Then, they are dropt into the lower chamber through the foreign object passing holes 175 and accumulated on the bottom cover 130.

A plurality of coupling ribs 176 are formed on an upper end of the filter member 170. The coupling ribs 176 functions to be detachably mounted the filter member 170 on the airflow guide plate 150. Therefore, a plurality of fixing ribs (not shown) coupled to the coupling ribs 176 are formed on the airflow guide plate 150.

The operation of the above-described dust collection unit will be described hereinafter with reference to the accompanying drawing of FIG. 4.

When the vacuum cleaner is turned on, air containing foreign objects is sucked through a suction nozzle. The sucked air is directed into the first dust collection chamber 111 of the dust collection container 110 through the suction guide 115. Since the suction guide 115 extends in the tangential direction of the dust collection container 110, the sucked air spirally rotates in the first dust collection chamber 111, in the course of which relatively large foreign objects are dropt down through the foreign object passing holes 175 and the air still containing relatively small foreign objects is directed into the filter member 170 through the air passing holes 172 of the filter member 170. While the air passes through the filter member 170, relatively large foreign objects d contained in the air are primarily filtered. The air, which has passed through the filter member 170 is directed above the airflow guide plate 150 through the air intake tube 152.

The air directed above the airflow guide plate 150 is directed into the small cyclones 160. At this point, the air directed into each of the small cyclones 160 is guided by the air intake guide member 168 and directed into the cylindrical tube 162 through the air intake hole 166. Since the small cyclone is provided in plurality, there is not confliction between the airflow paths.

The air directed into the cylindrical tube 162 flows in the tangential direction from the sidewall of the cylindrical tube 162, it spirally rotates and descends toward the cone-shaped tube 164.

When the air reaches the lower end of the cone-shaped tube, the air changes its flowing direction along the inner wall of the cone-shaped tube 164 to flow upward. That is, when the air spirally rotates and descends along the inner wall of the cone-shaped tube 164, a rising air current is generated at a center portion. The rising air current is directed to the exhaust passage 142 formed above the exhaust guide plate 140 through the discharge guide tube 144.

In the above process, minute particles d' contained in the air spirally rotates and drops along the inner wall of the cone-shaped tube 164 and are exhausted through a lower opening of the cone-shaped tube 164. In addition, since the first and second dust collection chambers 111 and 112 are completely separated from each other by the barrier 113, the foreign objects d and d' collected in the respective dust collection chambers 111 and 112 are affected by totally different airflow. Therefore, the foreign objects d and d' can be stably collected without being affected by other airflow.

The air guided upward through the discharge guide tube 144 is exhausted to an external side through the exhaust guide 122 of the top cover 120 via the exhaust passage 142.

Figure 4:
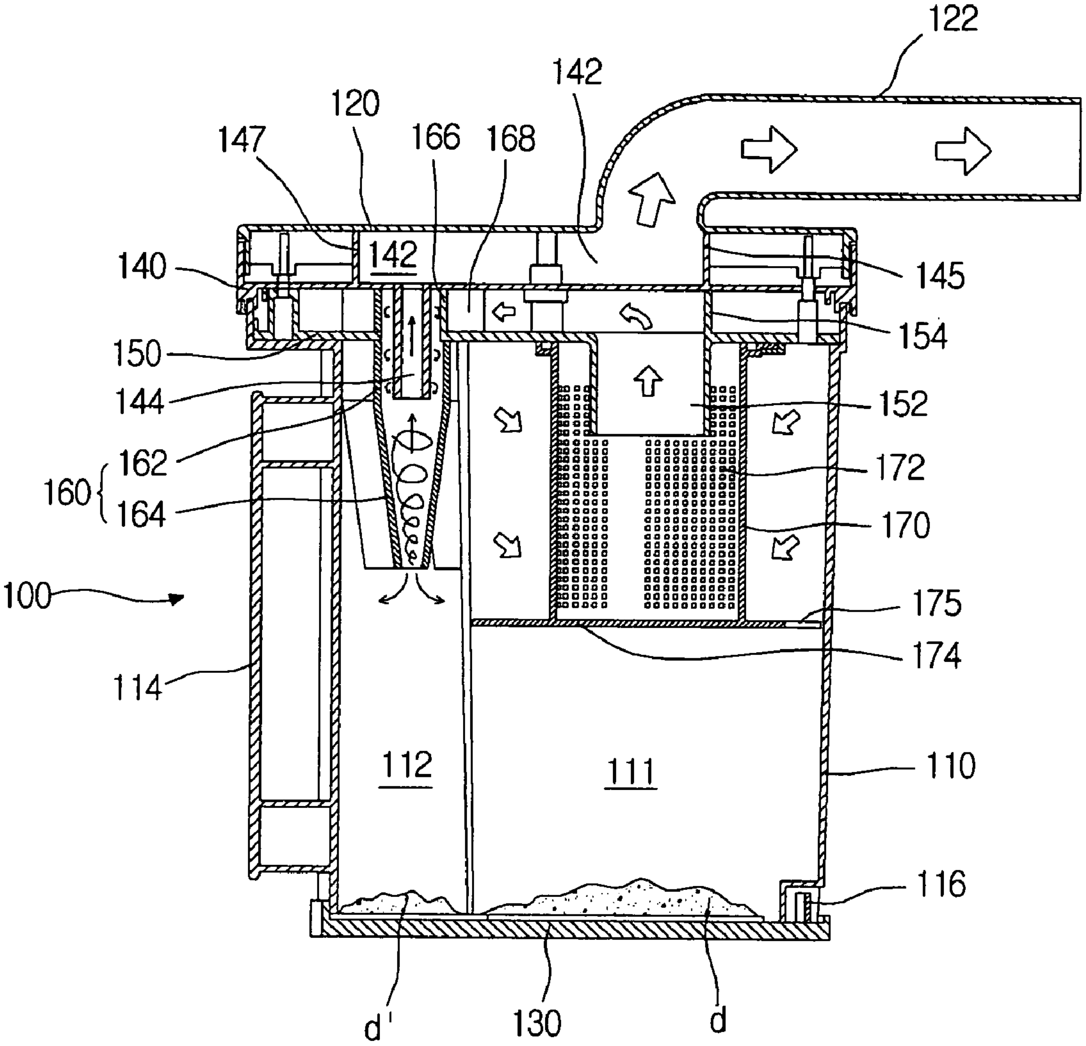
FIG. 4 is a sectional view taken along line I-I' of FIG. 1.

The airflow direction and foreign object collection are indicated by arrow in FIG. 4.

Figure 5:
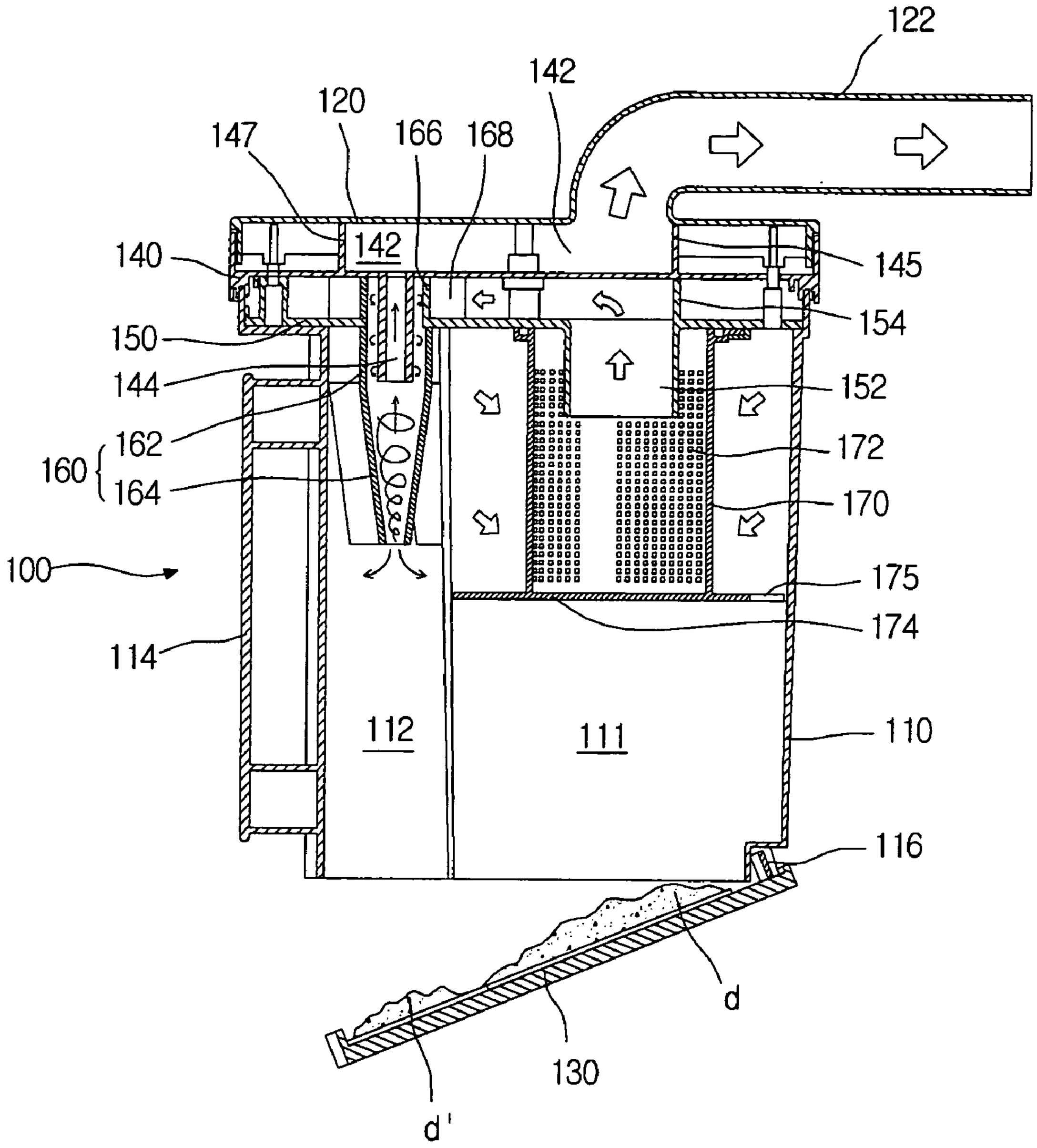
FIG. 5 is a view illustrating a state where collected foreign objects are removed from the dust collection unit according to the present invention.

In order to remove the foreign objects accumulated on the bottom cover 130, the bottom cover 130 is opened. This state is shown in FIG. 5.

At this point, the coupling state of the coupling device provided on the left end of the bottom cover 130 is released so that the bottom cover 130 pivots downward about the coupling hinge 116 formed on the right end of the bottom cover 130, by which the foreign objects d and d' accumulated on the bottom cover 130 is exhausted.

Meanwhile, the foreign objects may be partly accumulated on the dividing plate 174. These foreign objects are removed after separating the filter member 170 and the airflow guide plate 150 from the dust collection container 10.

In order to separate the airflow guide plate 150, the top cover 120 is first separated from the dust collection container 110. That is, since the airflow guide plate 150 and the exhaust guide plate 140 are coupled to the top cover 120 by a single group of screws, when the top cover 120 is separated, the airflow and exhaust guide plates 150 and 140 are simultaneously separated from the dust collection container 110.

Then, the filter member 170 is rotated and separated from the airflow guide plate 150. That is, when the filter member 170 is rotated, the coupling ribs 176 of the filter member 170 are released from the fixing ribs of the airflow guide plate 150, thereby separating the filter member 170 from the airflow guide plate 150.

After the filter member 170 is separated, it is washed by water.

It will be apparent to those skilled in the art that various modifications and variations can be made in the present invention. Thus, it is intended that the present invention covers the modifications and variations of this invention provided they come within the scope of the appended claims and their equivalents.

For example, the second dust collection part may be provided on a right, front or rear portion of the first dust collection part instead of the left portion.

In addition, the filter member may be formed through other manufacturing process instead of the injection molding process. Further more, other types of filters such as the bending filter or multi-filter may be used.

Furthermore, the exhaust and airflow guide plates 140 and 150 may be coupled to the top cover 120 by other types of fasteners instead of the screws.

In addition, the exhaust and airflow guide plates 140 and 150 may be coupled to the dust collection container 110 instead of to the top cover 120.

What is claimed is:

1. A dust collection unit for a vacuum cleaner, comprising:

a first chamber having a top and a bottom and a filter provided therein, the filter having a cylindrical shape with an opening in a middle and a plurality of holes formed on a surface of the filter, the first chamber further having an air guide provided near the top of the first chamber to guide the air introduced in a tangential direction along an inner surface of a wall of the first chamber such that the air spirally rotates in the first chamber and foreign objects of a first type in the air drops toward the bottom of the first chamber, and the air passes through the holes of the filter to flow through the opening in the middle of the filter;

a second chamber having a top and a bottom, a portion of the wall of the first chamber being commonly shared by the second chamber;

a bottom cover commonly shared by the first chamber and the second chamber, the bottom cover being pivotally connected to the wall for opening or closing both bottoms of the first and second chambers, wherein a first surface area of the bottom cover is used to cover the bottom of the first chamber and a second surface area of the bottom cover is used to cover the bottom of the second chamber, and the first surface area is larger than the second surface area;

a first guide plate having an air intake tube provided on a portion of the first guide plate, which is provided over the top of the first chamber, and a plurality of air intake holes provided on another portion of the first guide plate, which is provided over the top of the second chamber, each of the plurality of air intake holes having a smaller diameter than the air intake tube and the air intake tube being aligned with the opening in the middle of the filter, a plurality of small cyclones aligned under the plurality of the air intake holes, a plurality of air intake guide members aligned over the plurality of air intake holes, and an airflow guide provided on the first guide plate and a portion of the air flow guide being provided immediately adjacent to a portion of the air intake tube, wherein the air flowing through the middle of the filter is guided through the air intake tube, the airflow guide directs the air towards the plurality of air intake holes and the plurality of air intake guide members guide the air into the plurality of cyclones such that the air spirally rotates and foreign objects of a second type in the air drop toward the bottom of the second chamber;

a second guide plate provided over the first guide plate, the second guide plate having a plurality of openings and a first barrier to guide the flow of air, air flowing upwards from the plurality of small cyclones flow through the plurality of openings; and a top cover provided over the second guide plate, the top cover having an air exhaust guide on one side of the top cover, wherein the air flowing through the openings is directed by the first barrier to the air exhaust guide.

2. The dust collection unit of claim 1, wherein an exhaust passage is formed between the top cover and the second guide plate.

3. The dust collection unit of claim of claim 1, wherein the second guide plate has a shape of the top cover.

4. The dust collection unit of claim 1, wherein the airflow guide divides the first guide plate into two regions.

5. The dust collection unit of claim 1, wherein the first guide plate and the second guide plate are attached by a screw.

6. The dust collection unit of claim of claim 5, the top cover is attached to the second guide plate using the same screw.

7. The dust collection unit of claim of claim 1, wherein the air intake guide member is formed at least one of the left side or right side of the air intake hole.

8. The dust collection unit of claim 1, wherein the air flow guide has first and second straight portions and a curved portion provided between the first and second straight portions, the curved portion being immediately adjacent to the air intake tube.

9. The dust collection unit of claim 1, wherein the air intake tube partially extends downward from the first guide plate to guide the air passing through the filter to direct the air above the first guide plate.

10. The dust collection unit of claim 1, wherein the first barrier divides the second guide plate into two regions.

11. The dust collection unit of claim 10, wherein the first barrier has a contour to match a contour of the air exhaust guide.

12. The dust collection unit of claim 11, wherein the contour is a semi-circular shape.

13. The dust collection unit of claim 10, wherein the second guide plate further comprises a second barrier near the discharge tubes, the second barrier further dividing the second guide plate to have a third region.

14. The dust collection unit of claim 1, wherein a divider is provided on a lower end of the filter, the divider dividing the first chamber into upper and lower chambers, the divider preventing the foreign objects collected in the lower chamber from scattering into the upper chamber.

15. The dust collection unit of claim 14, wherein the divider is a divider plate having passing holes formed on both side ends of the divider plate.

16. The dust collection unit of claim 1, wherein coupling ribs are provided on an upper end of the filter to detachably mount the filter to the first guide plate.

17. The dust collection unit of claim 1, wherein the bottom of the first chamber has a circular like profile.

18. The dust collection unit of claim 1, wherein the bottom of the second chamber has a crescent like profile.

19. The duct collection unit of claim 1, wherein the foreign objects of the first type are large dust particles and the foreign objects of the second type are smaller dust particles than the large dust particles.

20. The dust collection unit of claim 1, wherein the plurality of openings include discharge guide tubes of a cylindrical shape and projected downwards from the second guide plate, the plurality of discharges guide tubes extending into the plurality of small cyclones.

* * * * *